March 7, 1944. K. F. GALLIMORE 2,343,504
TABLE DRIVE FOR MACHINE TOOLS
Filed Feb. 11, 1942 9 Sheets-Sheet 1

Inventor
Keith F. Gallimore
By Parker, Carlson, Pitzner & Hubbard
Attorneys

March 7, 1944.　　　K. F. GALLIMORE　　　2,343,504
TABLE DRIVE FOR MACHINE TOOLS
Filed Feb. 11, 1942　　　9 Sheets-Sheet 3

Inventor
Keith F. Gallimore

By Parker, Carlson, Pitzner & Hubbard
Attorneys.

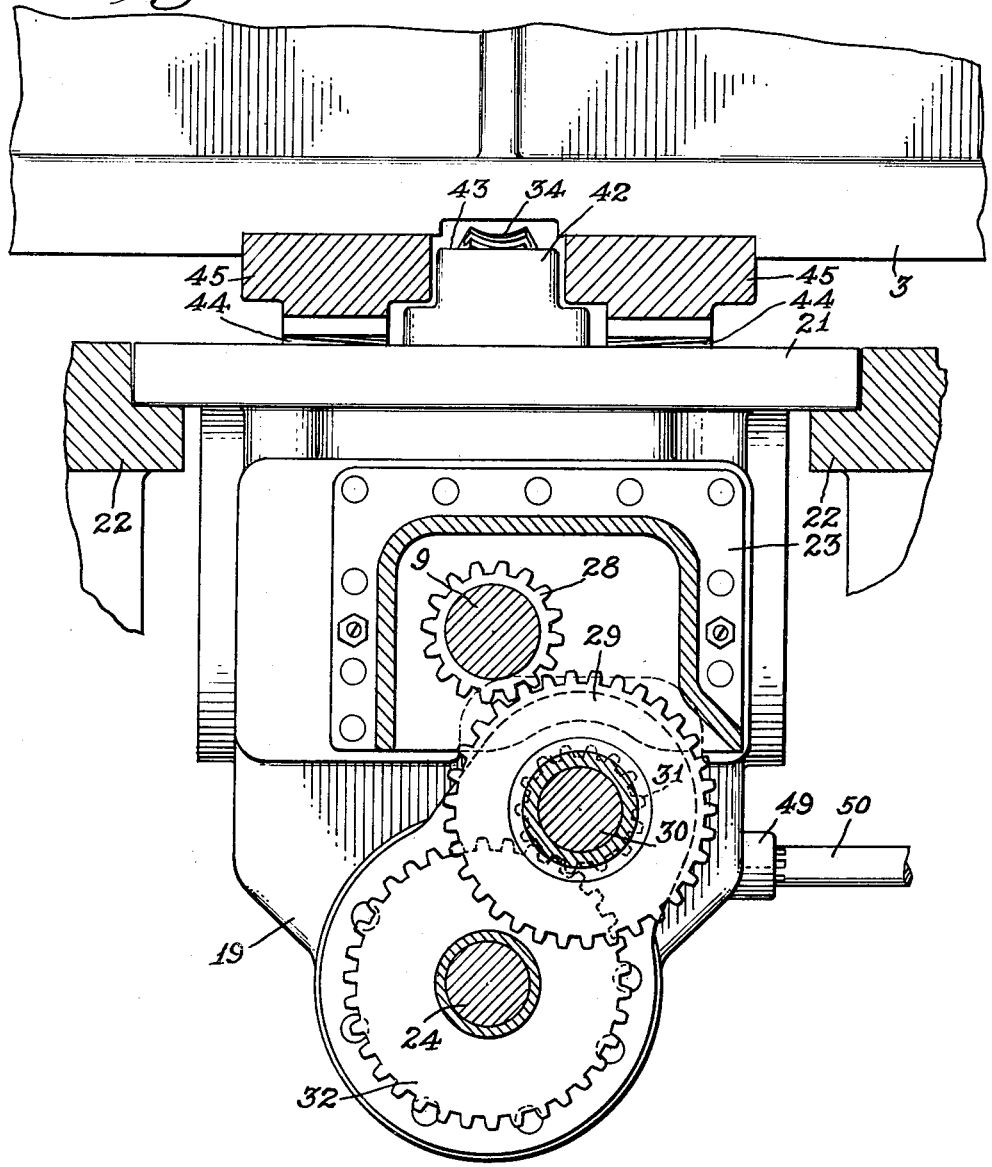

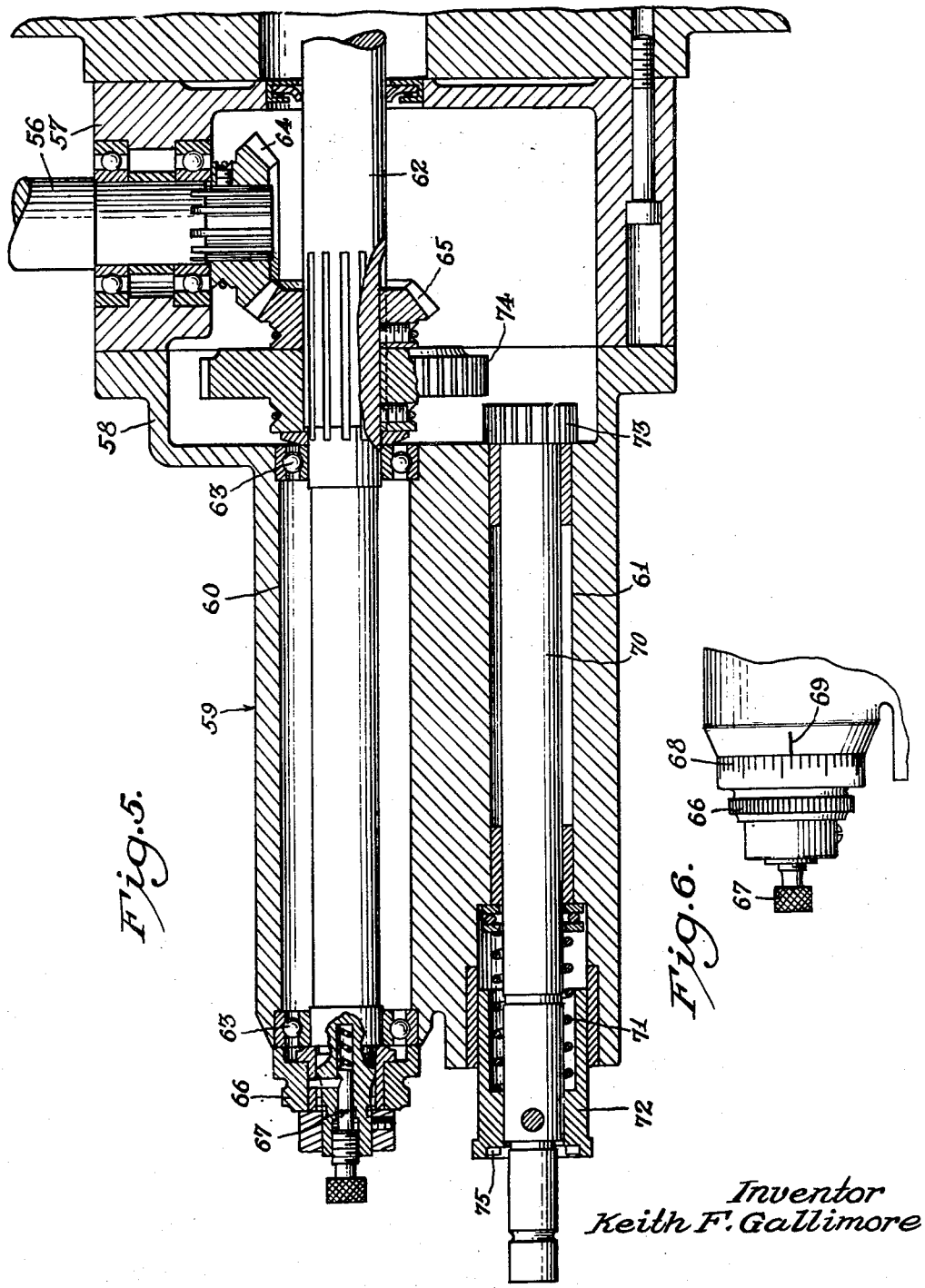

March 7, 1944. K. F. GALLIMORE 2,343,504
TABLE DRIVE FOR MACHINE TOOLS
Filed Feb. 11, 1942 9 Sheets-Sheet 6

Inventor
Keith F. Gallimore
By
Parker, Carlson, Pitzner & Hubbard
Attorneys.

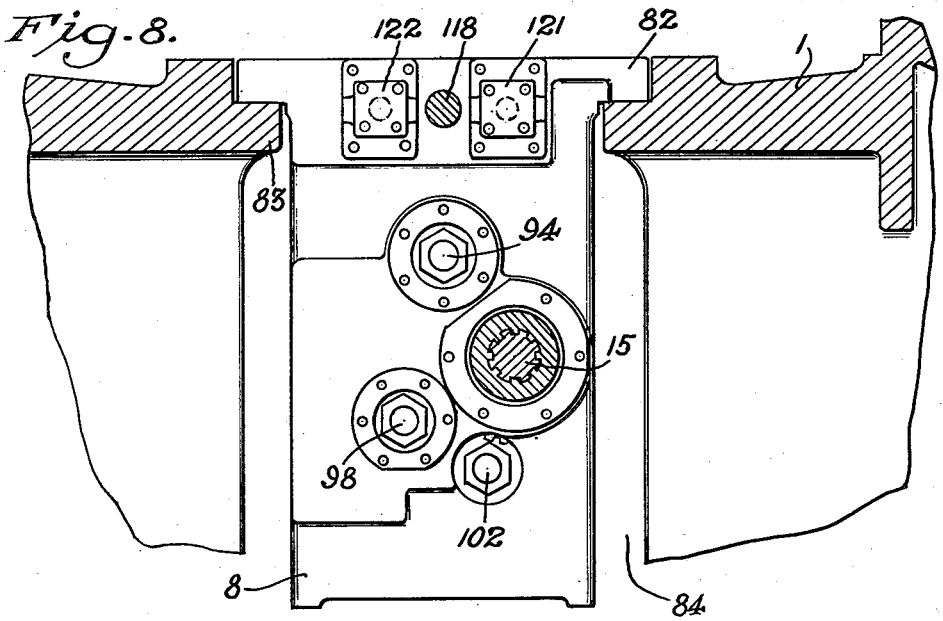
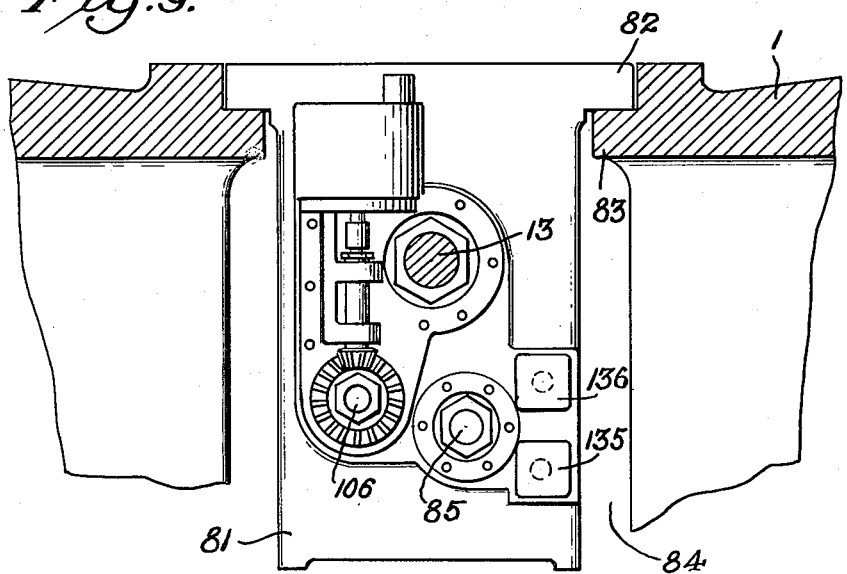

March 7, 1944. K. F. GALLIMORE 2,343,504
TABLE DRIVE FOR MACHINE TOOLS
Filed Feb. 11, 1942 9 Sheets-Sheet 8

Inventor
Keith F. Gallimore
By Parker, Carlson, Pitzner & Hubbard
Attorneys.

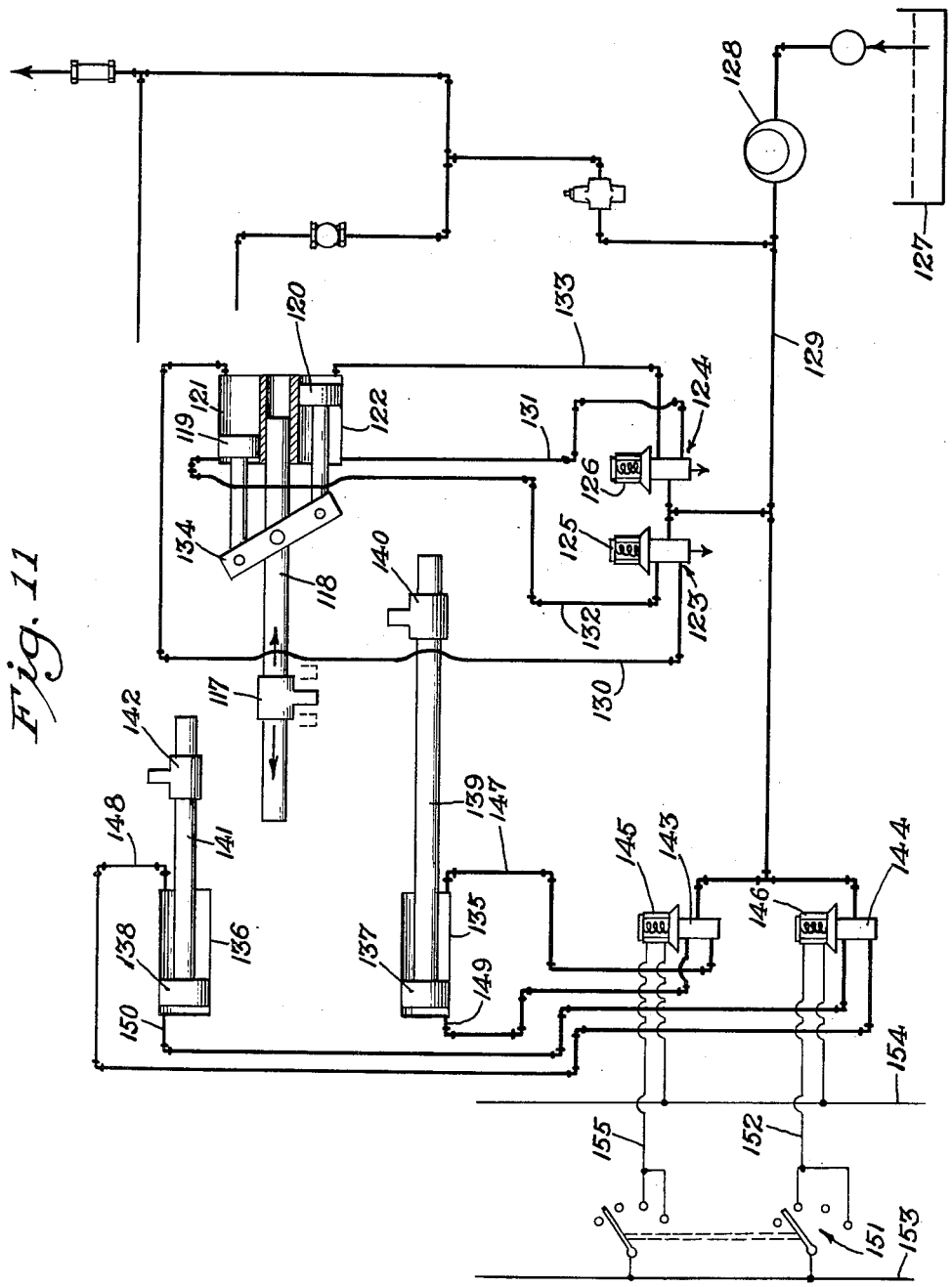

Patented Mar. 7, 1944

2,343,504

UNITED STATES PATENT OFFICE 2,343,504

TABLE DRIVE FOR MACHINE TOOLS

Keith F. Gallimore, Fond du Lac, Wis., assignor to Giddings & Lewis Machine Tool Co., Fond du Lac, Wis., a corporation of Wisconsin Application February 11, 1942, Serial No. 430,377

8 Claims. (Cl. 90—37)

The present invention relates to improvements in gear drive mechanisms for machine tool elements, and has particular reference to a new and improved drive mechanism for translating large and heavy tables, such as the table of a horizontal boring, drilling and milling machine of the planer type.

One of the objects of the invention is to provide a novel drive mechanism selectively adjustable to translate the table at a rapid traverse rate, or at any one of a series of feed rates.

Another object is to provide a new and improved drive mechanism of the foregoing character having shiftable change gears adjustable hydraulically by remote control.

A further object is to provide a drive mechanism of the foregoing character comprising a worm and worm wheel drive unit, and an adjustable feed unit connected in series to the table and mounted in the bed for the table, and a variable speed electric drive motor connected to the feed unit and mounted on one side of the bed.

Other objects and advantages will become apparent as the description proceeds.

In the accompanying drawings,

Fig. 4 is another vertical sectional view taken substantially along line 4—4 of Fig. 2.

Fig. 5 is a fragmentary horizontal sectional view of manual means for actuating the table.

Fig. 6 is a fragmentary detail view of a micrometer for indicating the position of adjustment of the table.

Fig. 8 is a right end elevational view of the feed unit.

Fig. 9 is a left end elevational view of the feed unit.

Fig. 11 is a diagrammatic representation of the hydraulic and electric control system for the feed unit.

Figure 1:
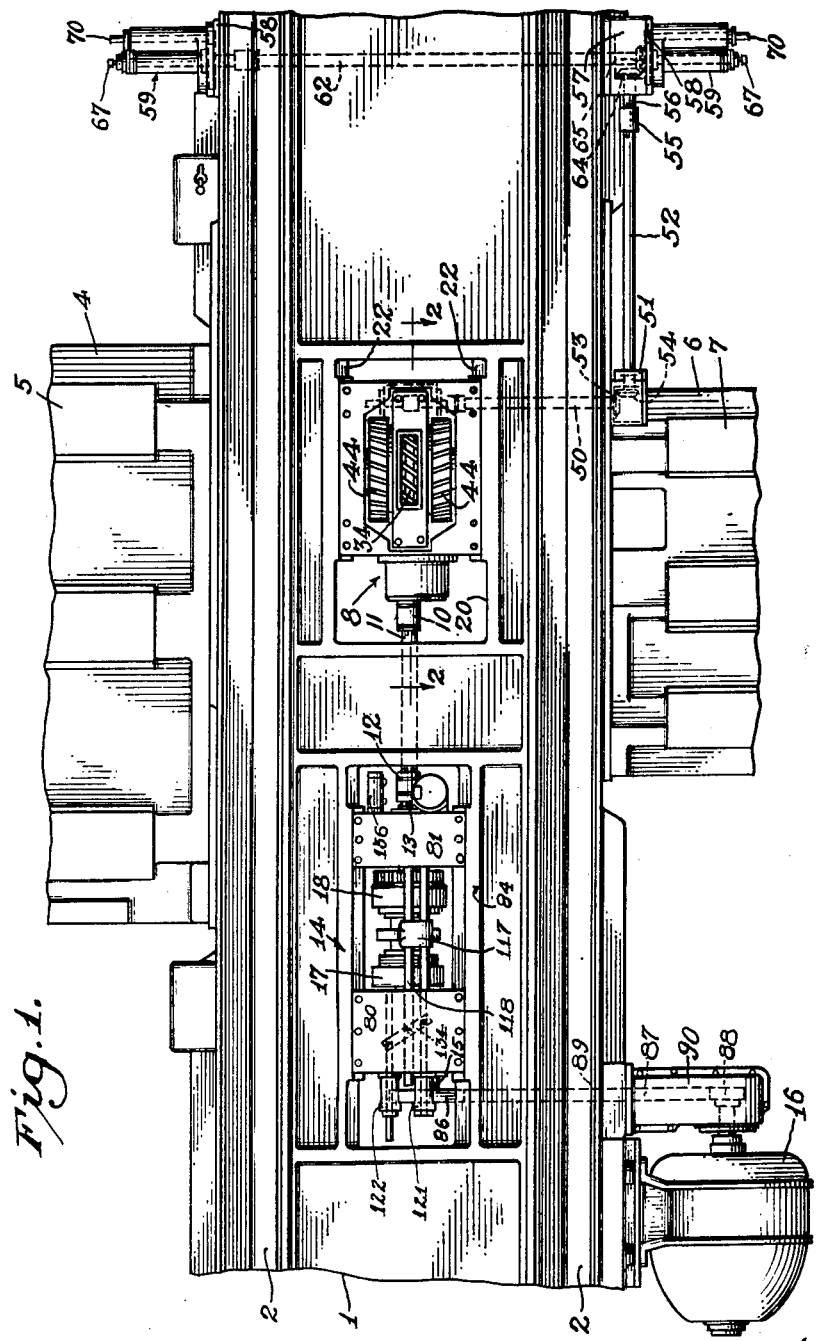
Figure 1 is a fragmentary plan view of the bed of a machine embodying the features of my invention, the machine table being removed to show the table drive mechanism.
Figure 2:
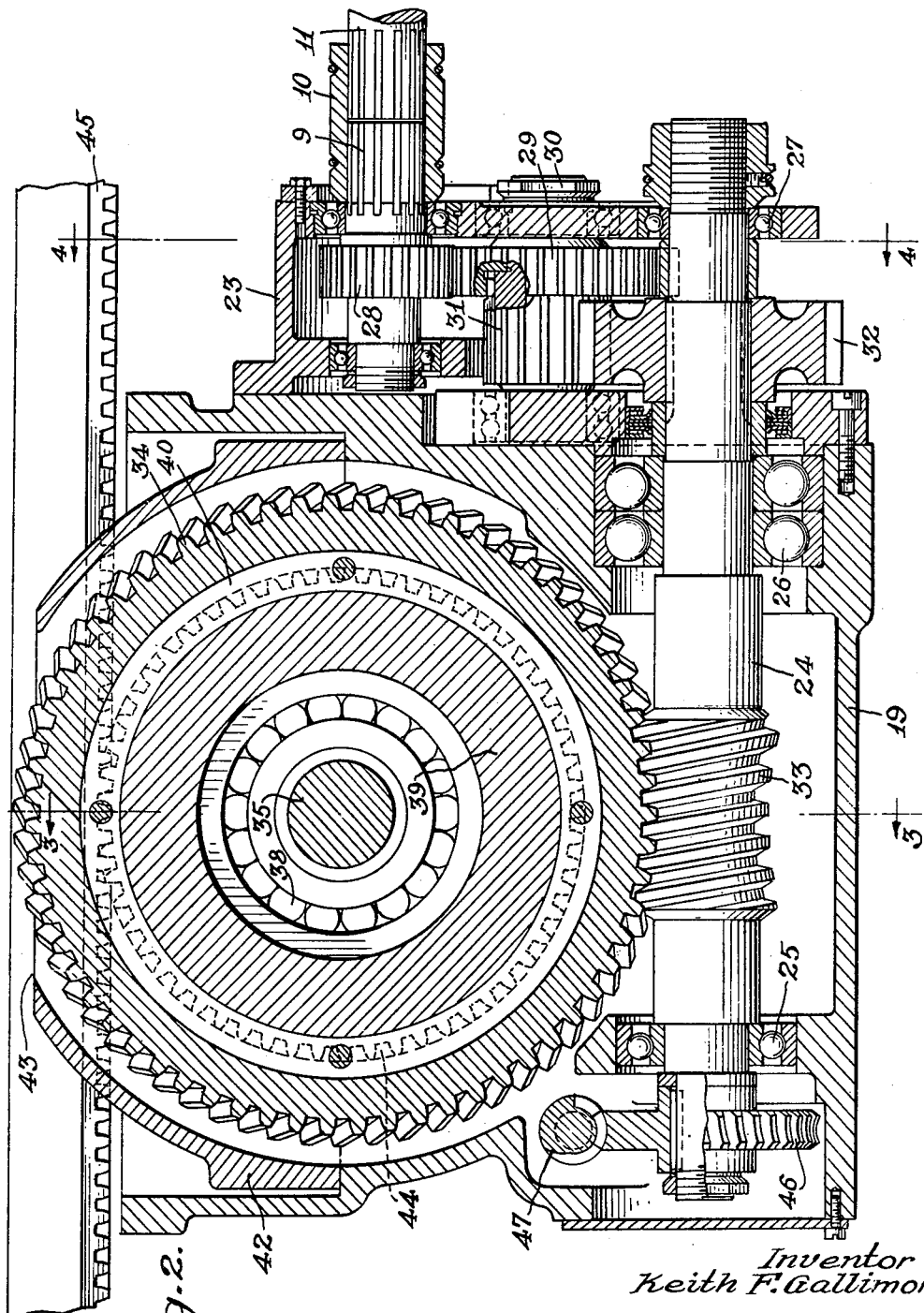
Fig. 2 is an enlarged vertical sectional view of a table drive unit forming part of the drive mechanism, taken substantially along line 2—2 of Fig. 1.
Figure 3:
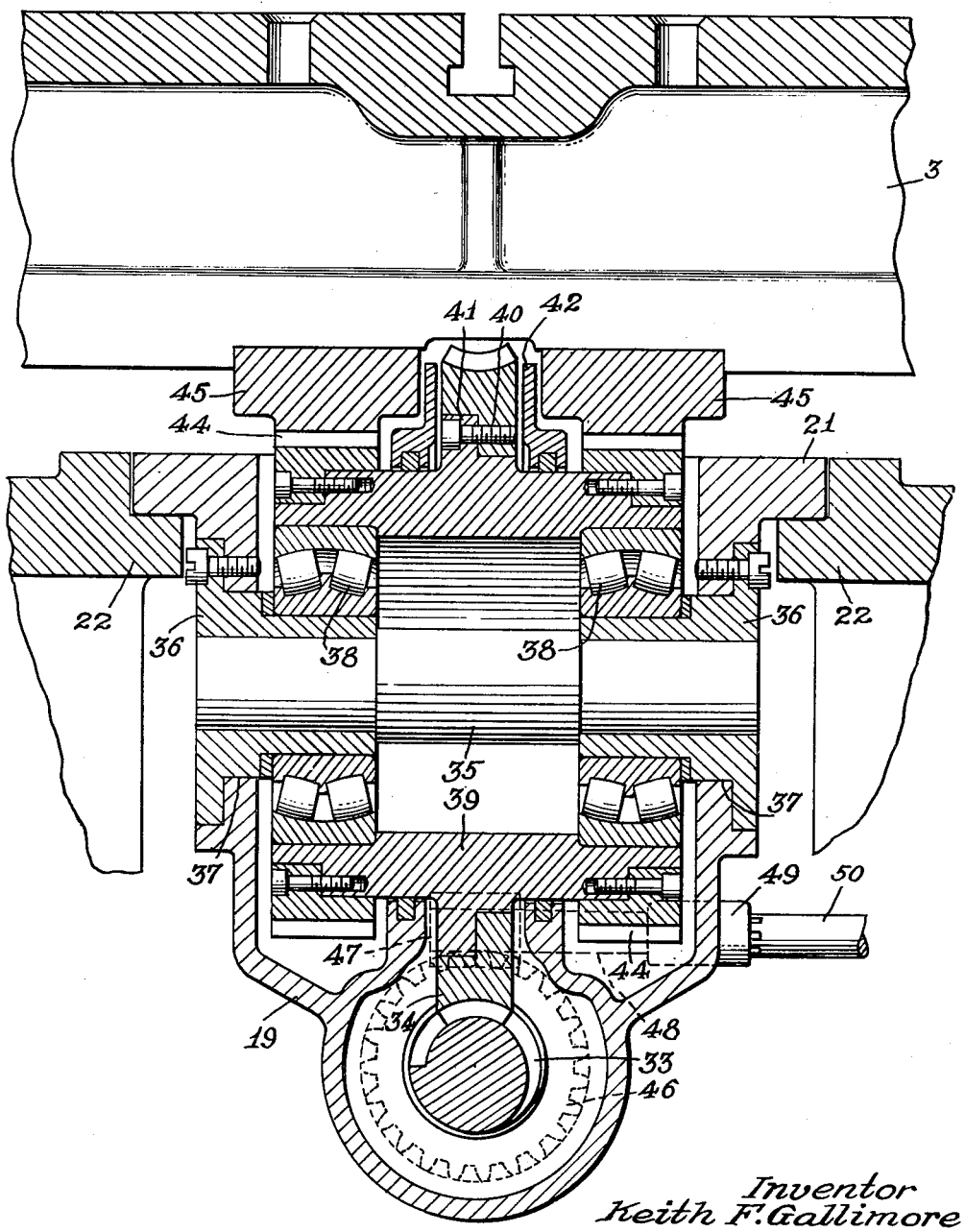
Fig. 3 is an enlarged transverse vertical sectional view of the table drive unit taken along line 3—3 of Fig. 2.
Figure 7:
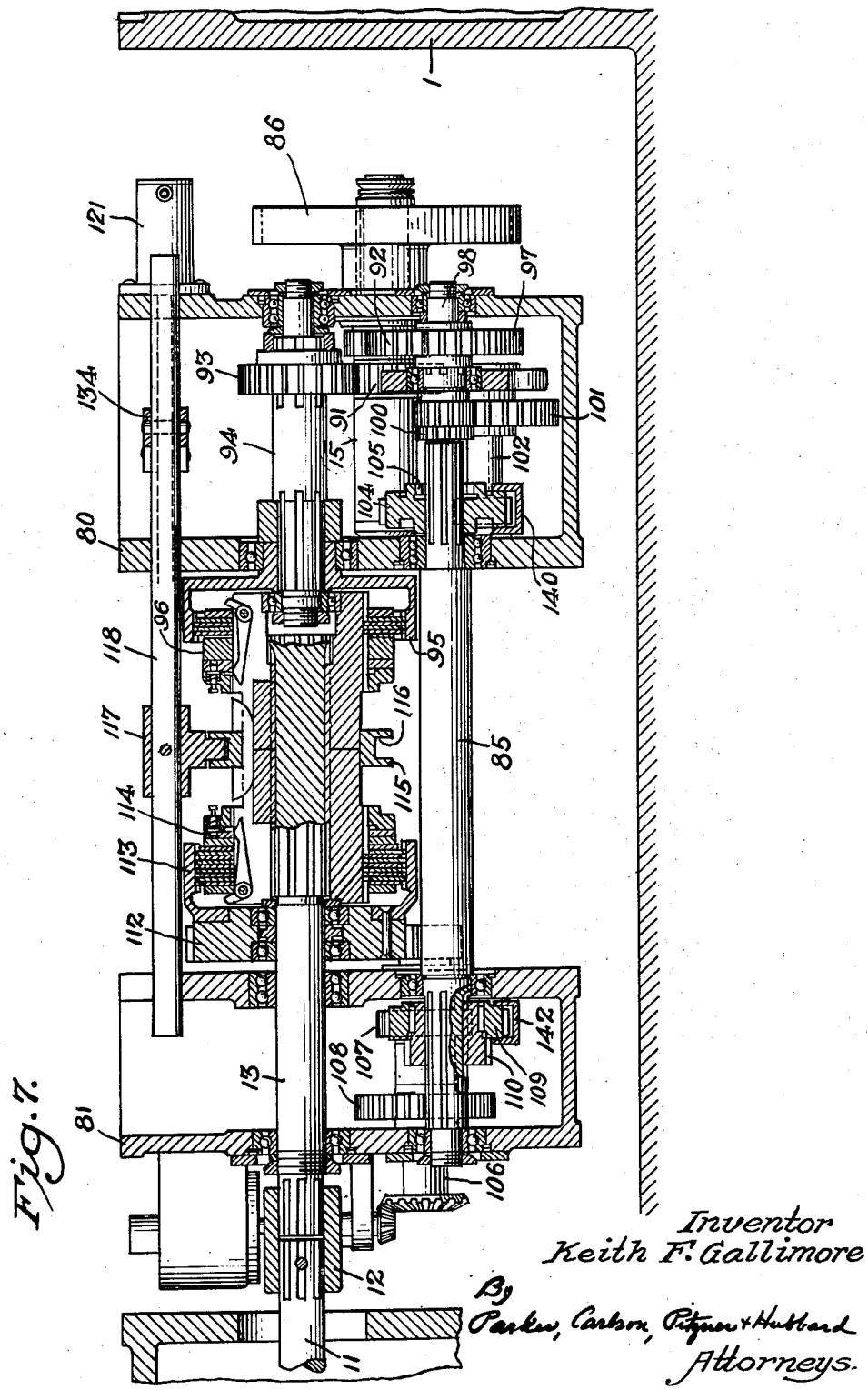
Fig. 7 is a longitudinal vertical view of a feed unit in the drive mechanism.
Figure 10:
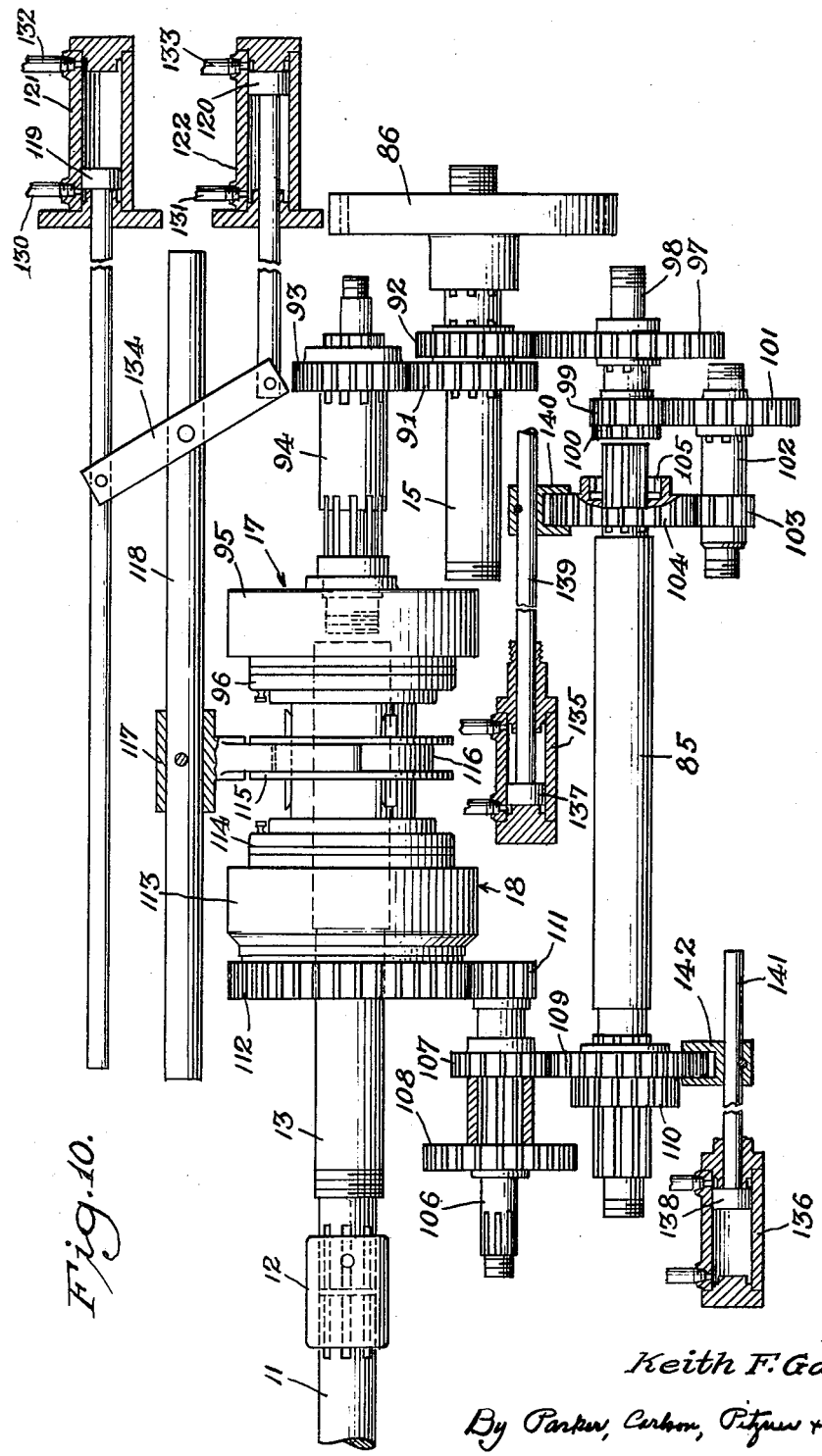
Fig. 10 is a diagrammatic representation of the feed unit with the gearing shown in plan development.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

Referring more particularly to the drawings, the table drive mechanism constituting the exemplary embodiment of the invention may be utilized for tables or carriages in various types of machine tools, but is especially suited for and hence shown in connection with the table of a horizontal boring, milling and drilling machine of the planer type. In general, the machine comprises an elongated horizontal bed 1 having spaced parallel guideways 2 formed in the top and extending longitudinally thereof. A worktable 3 is supported on the guideways 2 for longitudinal reciprocation.

Secured to one side of the bed 1 substantially midway of its ends is a horizontal base 4 having guideways 5 for supporting a headstock column (not shown) for translation in a direction perpendicular to the table travel. A similar base 6 is secured to the other side of the bed 1, and has guideways 7 for supporting a tailstock column (not shown) for translation in a direction perpendicular to the table travel. It will be understood that a spindle head and a tailstock are normally mounted respectively on the columns for synchronous vertical translation. These elements are not shown since per se they form no part of the present invention.

The table drive mechanism comprises a novel worm and worm wheel drive unit 8 of heavy duty characteristics which is mounted within the bed 1 midway of the ends and on the longitudinal center line, and which is operatively connected to the table 3 to translate the latter. The drive unit has a power inlet shaft 9 which is connected through a spline coupling 10 to an intermediate shaft 11, in turn connected through a spline coupling 12 to the outlet shaft 13 of a table feed unit 14.

The table feed unit 14 is mounted within the rear end of the bed 1 in substantial alinement with the drive unit 8, and has a power inlet shaft 15 connected to a reversible variable-speed electric drive motor 16 mounted on one side of the bed. The feed unit 14 includes a rapid traverse clutch 17 for connecting the shaft 15 to the shaft 13 to translate the table 3 at a high rate of speed, and a feed clutch 18 for connecting the shafts through a series of selective speed change gear mechanisms to translate the table at different feed plates. By superimposing changes in the speed of the electric motor 16 on the feed unit 14, the range and number of available speeds and feeds for the table 3 is considerably extended.

The table drive unit

The table drive unit 8 comprises a housing 19 which is suspended within a recess 20 in the bed 1. The housing is formed at the top with a marginal flange 21 resting on and bolted to spaced parallel longitudinal flanges 22 formed in the top of the bed at opposite sides of the recess 20. Removably bolted to one end of the housing 19 is a gear casing 23 in which the power inlet shaft 9 is suitably journaled. A worm shaft 24 extends longitudinally through the lower portion of the housing 19 and the casing 23, and is suitably journaled in spaced antifriction bearings 25, 26 and 27.

Fixed on the power inlet shaft 9 is a gear 28 meshing with a gear 29 on a parallel shaft 30 journaled in the casing 23. A second gear 31 on the shaft 30 meshes with a gear 32 on the worm shaft 24 to establish a reduction gear drive from the power inlet shaft 9 and the worm shaft.

A worm 33 is fixed on the shaft 24 between the bearings 25 and 26, and meshes with a worm wheel 34 mounted for rotation about a fixed shaft 35 extending through the housing 19. In the present instance, the opposite ends of the shaft 35 are reduced in diameter, and are supported in flanged sleeves 36 removably inserted in openings 37 in the opposite side walls of the housing 19. The sleeves are suitably bolted in position and project through the openings 38 into the housing 19. The inner raceways of two axially spaced roller bearings 38 are fitted respectively on the inner ends of the sleeves 36, and the outer raceways of the bearings are fitted into opposite ends of a tubular sleeve 39 constituting the hub of the worm wheel 34. In the present instance, the worm wheel 34 is annular in form, and has an inner peripheral flange 40 interfitting with and bolted to an outer peripheral flange 41 on the sleeve 39 intermediate the ends. A guard housing 42 of arcuate form is mounted in the upper portion of the body housing 19, and substantially encloses the upper half of the worm wheel 34, except for a clearance slot 43 in the top through which the upper gear teeth slightly project.

Two large drive gears 44 are rigidly bolted to the ends of the sleeve 39 at opposite sides of the worm wheel 34 for rotation therewith, and mesh respectively with two parallel longitudinal gear racks 45 secured to the underside of the table 3 to complete the table drive connection from the drive unit 8.

The worm 33 is of the hourglass type, and is formed to have substantially full tooth engagement throughout its length with the worm wheel 34 so as to afford a strong and durable drive. The two gears 44 meshing with the parallel gear racks 45 also afford a strong, durable and balanced drive connection between the worm wheel 34 and the table 3. Consequently, the table drive unit 8, although compact in size, is sturdy and powerful in action, and has load characteristics rendering it especially advantageous in translating large and heavy tables of the type commonly employed in horizontal boring, drilling and milling machines.

Provision is also made for operating the table 3 manually through the drive unit 8, and for indicating the extent of travel of the table. The manual drive means comprises a worm gear 46 fixed on one end of the worm shaft 24 outside of the bearing 25, and meshing with a worm 47 on a transverse shaft 48 journaled in the housing 19. The worm 47 has a long lead so that it can be driven from the gear 46. One end of the shaft 48 is connected through a spline coupling 49 to an alined shaft 50 which is journaled in the bed 1 and extends into a gear casing 51 on one side thereof. A longitudinal shaft 52, along a side of the bed 1, extends at one end into the gear casing 51 wherein it is connected through bevel gears 53 and 54 to the shaft 50. The other end of the longitudinal shaft 52 is connected through a spline coupling 55 to a stub shaft 56 journaled in and extending through one wall of a gear housing 57 on the side of the bed.

The outer end of the housing 57 is closed by a cover plate 58 having a projection 59 formed with two parallel bores 60 and 61. A similar housing 57 with a cover plate 58 is mounted on the other side of the bed 1 and the cover plate thereof has an extension 59 with bores 60 and 61 alined crosswise of the machine with the corresponding bores of the housing supporting the shaft 56. Extending transversely through the bed 1 is a cross shaft 62 which is rotatably supported adjacent opposite ends by means of bearings 63 mounted in opposite ends of the bores 60. The stub shaft 56 is connected through meshing bevel gears 64 and 65 to the shaft 62. Each end of the shaft 62 is provided with a micrometer dial 66 which is adapted to be secured in adjusted position by means of a clamp 67. The dial is formed with suitable graduations 68 which are associated with a zero point 69 on the beveled end of the projection 59. It will be understood that the dial 66 serves to indicate the extent of movement. When desired, the clamp 67 may be released to permit adjustment of the dial 66 in relation to the zero point 69. Thereafter, the dial 66 may again be secured in position so that the continued movement of the table 3 may be accurately determined.

Extending through each bore 61 and suitably journaled therein is a manual actuating shaft 70 by means of which the table 3 may be driven through the unit 8 by manual operation upon adjustment of the clutches 17 and 18 into neutral position. The shaft 70 is axially slidable and is normally biased into its outermost position by means of a coiled compression spring 71 acting against a sleeve 72 pinned to the shaft. A gear 73, fixed on the inner end of the shaft 70, is movable into and out of meshing engagement with a gear 74 splined to the cross shaft 62. The outer end of the sleeve is formed with teeth 75 adapted for engagement by a hand crank (not shown) which may be slipped onto the outer end of the shaft 70. By forcing the shaft endwise against the action of the spring 71 to engage the gears 73 and 74, and then rotating the crank, the table will be translated manually. It will be evident that this may be accomplished from either side of the table.

The table feed unit

The table feed unit 14 in its preferred form comprises two change gear housings 80 and 81 which respectively support the power inlet shaft 15 and the power outlet shaft 13. In the present instance, each housing is formed at the top with side flanges 82 resting on and bolted to spaced parallel longitudinal supporting flanges 83 formed in the top wall of the bed 1, and is suspended from the flanges within a recess 84 in the bed. The housings respectively enclose two two-speed gear mechanisms as hereinafter more fully described which are connected in series to the power inlet shaft 15 and which are interconnected by a shaft 85. The rapid traverse and feed clutches 17 and 18 are mounted on the power outlet shaft 13 between the housings 80 and 81 and are arranged for selective actuation either into neutral, or to connect the shafts 15 and 13 for a rapid traverse drive, or indirectly through the selective speed change gear mechanisms for a slow feed drive. A sequence of table feeds is obtainable by adjustment of the feed drive and selective changes in the speed of the driving motor 16.

One end of the power inlet shaft 15 of the feed unit 14 projects from the housing 80, and has a sprocket wheel 86 secured thereto. The sprocket wheel 86 is connected through a silent chain 87 to a sprocket wheel 88 fixed on the shaft of the electric motor 16. The chain 87 extends through a suitable opening 89 in one side wall of the bed 1. A guard housing 90 is bolted to the bed 1 over the opening 89 to enclose the chain 87 and the sprocket wheel 88.

Fixed on the power inlet shaft 15 within the housing 80 are two gears 91 and 92. The gear 91 meshes with a gear 93 on a parallel shaft 94 journaled in the housing 80 and located in axial alinement with the power outlet shaft 13. The rapid traverse clutch 17, which is herein shown as of the disk type, has a driver 95 fixed on the shaft 94 and a driven element 96 connected to the shaft 13. Consequently, when the clutch 17 is engaged, the rapid traverse drive will be established from the shaft 15 through the gears 91 and 93, the shaft 94 and the clutch 17 to the shaft 13 to translate the table 3 at a high rate of speed, and in a direction determined by the direction of rotation of the motor 16.

The gear 92 is connected to the two-speed change-gear mechanism in the housing 80, and meshes with a gear 97 fixed on a stub shaft 98 in axial alinement with the shaft 85. One end of the shaft 98 is formed with a pinion 99 and an end clutch element 100. The pinion 99 meshes with a gear 101 on a parallel back shaft 102 journaled within the housing 80. Fixed on the shaft 102 is a pinion 103 adapted for meshing engagement with a gear 104 slidably splined on one end of the shaft 85. The gear 104 is formed with an internal clutch element 105 adapted for engagement with the element 100 on the shaft 98. Consequently, the gear 104 is shiftable to engage the clutch elements 100 and 105 so as to establish a direct drive between the shafts 98 and 85, or into meshing engagement with the pinion 103 so as to establish an indirect drive between these shafts through the back shaft 102, thereby providing two different selective rates of feed.

The two-speed change-gear mechanism within the housing 81 includes the shaft 85 and a parallel shaft 106. Two axially spaced gears 107 and 108 are fixed on the shaft 106. Two gears 109 and 110 in a cluster are splined for axial movement on the shaft 85, and are adapted in one position of adjustment to connect the gears 107 and 110, and in another position of adjustment to connect the gears 108 and 110, thereby providing two different feed drives between the shafts 85 and 106. A pinion 111 fixed on one end of the shaft 106 meshes with a gear 112 rigid with the driver 113 of the feed clutch 18. Like the rapid traverse clutch 17, the feed clutch 18 is shown as of the disk type, including the driver 113, which in this instance is rotatable about the outlet shaft 13, and a driven element 114 connected to the shaft.

The two clutches 17 and 18 are adapted to be engaged alternately by an actuating collar 115 formed with a peripheral groove 116 and shiftable axially through neutral position in opposite directions. A shifter shoe 117 engages in the groove 116, and is fixed on a shifter rod 118 extending slidably through the housings 80 and 81 parallel to the clutch axis. When the shifter rod 118 is in its intermediate position, both clutches 17 and 18 will be disengaged to interrupt the table drive. Upon movement of the shifter rod 118 out of neutral to the right, the feed clutch 18 will be disengaged and the rapid traverse clutch 17 will be engaged to establish the rapid traverse drive. Upon movement of the shifter rod 118 out of neutral to the left, the rapid traverse clutch 17 will be disengaged and the feed clutch 18 will be engaged to establish feed drive, whereby to translate the table at any one of a plurality of feed rates as determined by the adjustment of the change-speed gear mechanisms in the feed unit 14 and the speed of the electric motor 16.

Shifting of the rod 118 is accomplished by a coacting pair of pistons 119, 120, slidable in cylinders 121 and 122, respectively, and to which pressure fluid is supplied through a pair of two-way valves 123 and 124 operated by solenoids 125 and 126. These two-way valves are of conventional form, being yieldably biased to the positions shown, and actuated to their second or opposite positions by energization of the associated solenoids. In the present instance, with the solenoids 125 and 126 deenergized, pressure fluid is supplied from a tank 127 by a pump 128 through a branched pressure line 129 to the valves 123, 124 and then through lines 130 and 131 to the right and left hand faces respectively of the pistons 119 and 120, thereby locking the same in the position shown. Fluid lines 132 and 133, connected with the opposite piston faces, exhaust fluid from them, through the valves 123, 124 back to the tank 127. The actuator pistons 119, 120 are connected to the clutch actuator rod 118 through a link 134 pivoted intermediate its ends to the rod, and pivotally connected at its outer ends to the piston rods.

To engage the rapid traverse clutch 17, the solenoid 125 is energized, reversing the position of the two-way valve 123. Thereupon, pressure fluid is supplied through the line 132 to the left-hand face of the piston 119 to shift it to the right while fluid is exhausted to the tank 127 from the right face of the piston through the line 130. In this way, the intermediate link 134 is fulcrumed to pull the clutch actuator rod 118 to the right to its rapid traverse position. Similarly, to engage the feed clutch 18, and disengage the rapid traverse clutch 17, the solenoid 126 is energized and the solenoid 125 deenergized. Thereupon, pressure fluid is supplied to the right face of the piston 120 through line 133 and the valve 124, while the piston 119 is returned to the position illustrated by pressure fluid supplied through the line 130 and valve 123. In this way, the link 134 is actuated to shift the rod 118 into the extreme left position so as to engage the feed clutch 18. To return the clutch actuator to neutral at any time, the operator need only deenergize both the solenoids 125 and 126, whereupon the pistons will be returned to and locked by fluid pressure in the position shown.

Adjustment of the speed change gear mechanisms is effected hydraulically, and to this end two hydraulic actuator cylinders 135 and 136 are mounted on the housing 81.. Two pistons 137 and 138 are reciprocable in the cylinders 135 and 136. The piston 137 is connected to a shifter rod 139 extending into the housing 80. A shifter shoe 140 on the rod 139 engages the gear 104, and serves in opposite positions of adjustment to move the gear either into mesh with the pinion 103 or into engagement with the clutch element 100. Similarly, the piston 138 has a shifter rod 141 extending slidably through the housing 81. A shifter shoe 142 fixed on the rod 141 engages the gear 109, and serves in opposite positions of adjustment to bring either the gears 108 and 110, or the gears 107 and 109, into mesh.

The supply of pressure fluid to the cylinders 135 and 136 is under the control respectively of two two-position valves 143 and 144 which are normally biased into one position and which are adapted to be actuated into the opposite position by two solenoids 145 and 146. When both solenoids 145 and 146 are deenergized, fluid is supplied from the pressure line 129 through the valve 143 and a line 147 to the right end of the cylinder 135 and through the valve 144 and a line 148 to the right end of the cylinder 136. Upon energization of the solenoids 145 and 146, the valves 143 and 144, respectively, will connect the lines 147 and 148 to the tank 127 and will connect the pressure line 129 through lines 149 and 150, respectively, to the left ends of the cylinders 135 and 136.

The solenoids 145 and 146 are controlled by a two-pole four-position switch 151. In the first position of the switch 151, both solenoids 145 and 146 will be deenergized. As a consequence, the gears 103 and 104 will be engaged and the gears 108 and 110 will be engaged to establish the first slow feed drive in the order of increasing progression. It will be understood that this rate of feed will be increased upon increasing the speed of the drive motor 16. Upon movement of the switch 151 into the second position, the solenoid 145 will remain deenergized, and the solenoid 146 will be connected through an electric line 152 across supply mains 153 and 154. As a consequence, the valve 144 will be actuated to connect the line 148 to drain and the line 150 to pressure, thereby shifting the piston 138 to the right so as to disengage the gears 108 and 110 and to engage the gears 107 and 109. This serves to establish the second feed rate in the order of increasing progression. At the third position of the switch 151, the solenoid 146 will be deenergized and the solenoid 145 will be energized by connection across the mains 153 and 154 through a line 155. As a consequence, the piston 138 will be returned to initial position to reengage the gears 108 and 110, and the gear 104 will be shifted to the right to engage the clutch elements 100 and 105. This serves to establish the third feed rate in the order of increasing progression. Upon movement of the switch 151 into the fourth position, the solenoid 145 will remain energized and the solenoid 146 will be energized to again shift the gear 109 into mesh with the gear 107, thereby establishing the fourth and highest feed rate.

It will be evident that by selective actuation of the switch 151 and adjustment of the speed of the motor 16, any one of a large number of feed rates may be obtained. The switch 151 facilitates control of the feed rate from a point remote from the table feed unit 14.

I claim as my invention:

1. A drive mechanism for a table reciprocable on a bed comprising, in combination, a worm and worm wheel drive unit mounted in said bed and having a drive connection with said table, a feed unit mounted in said bed and having a drive connection with said drive unit, means for driving said feed unit, said feed unit including a rapid traverse drive including a rapid traverse clutch and a selective feed drive including a feed clutch, said clutches having a common actuator movable through neutral in opposite directions to alternately engage and disengage said clutches, a shifter rod connected to said actuator, a lever pivoted intermediate its ends to said shifter rod, two hydraulic piston and cylinder actuators mounted in parallel relation on said unit and having piston rods pivotally connected respectively to opposite ends of said lever, and control means for supplying pressure fluid selectively to opposite ends of said hydraulic actuators whereby to locate the pistons thereof in phase at the same ends of said actuators to engage one or the other of said clutches, or out of phase in opposed ends of said actuators to disengage both of said clutches.

2. A drive mechanism for a table reciprocable on a bed comprising, in combination, a feed unit mounted in said bed and having a drive connection with said table, means for driving said feed unit, said feed unit including a rapid traverse drive including a rapid traverse clutch and a selective feed drive including a feed clutch and a series of multiple speed gear mechanisms with shiftable gear elements, said clutches having a common actuator movable through neutral in opposite directions to alternately engage and disengage said clutches, a shifter rod connected to said actuator, a lever pivoted intermediate its ends to said shifter rod, two hydraulic piston and cylinder actuators mounted in parallel relation on said unit and having piston rods pivotally connected respectively to opposite ends of said lever, control means for supplying pressure fluid selectively to opposite ends of said hydraulic actuators whereby to locate the pistons thereof in phase at the same ends of said actuators to engage one or the other of said clutches, or out of phase in opposed ends of said actuators to disengage both of said clutches, a plurality of parallel hydraulic piston and cylinder actuators mounted on said feed unit and connected respectively to said gear elements, and control means for supplying pressure fluid selectively to opposite ends of said last mentioned actuators whereby to shift said gear elements to obtain different selective feed adjustments.

3. A drive mechanism for a table longitudinally translatable on a horizontal elongated bed comprising, in combination, a worm and worm wheel drive unit mounted within said bed, a rack and pinion drive connection between said unit and said table, a feed unit mounted in said bed and connected to said drive unit and having a terminal inlet shaft, said feed unit being selectively adjustable to provide a rapid traverse drive or a feed drive at any one of a plurality of preset feed rates, and an electric motor mounted in one side of said bed and connected to said inlet shaft and selectively operable at different preset speeds of rotation to multiply the speed and feed rates afforded by adjustment of said feed unit.

4. A drive mechanism for a table longitudinally translatable on a horizontal elongated bed comprising, in combination, a first housing and a second housing supported in longitudinally spaced relation in said bed, a terminal inlet shaft journaled in said first housing, a terminal outlet shaft journaled in and extending through said second housing and to said first housing, a parallel shaft journaled in said housing in axial alinement with said outlet shaft and geared to said inlet shaft, a rapid traverse clutch including a driver fixed on said parallel shaft and a driven element connected to said outlet shaft, a first change speed gear mechanism in said first housing geared to said inlet shaft and including a shiftable gear element adjustable selectively into two different positions to provide two selective feed adjustments, a second change speed gear mechanism mounted in said second housing and connected to said first mechanism and including a shiftable gear element adjustable selectively into two different positions to provide two selective feed adjustments, a feed clutch having a driver rotatable on said outlet shaft and geared to said second mechanism and having a driven element connected to said outlet shaft, means for shifting said clutch elements simultaneously in opposite directions to alternately engage said clutches or to disengage both of said clutches, and means for selectively shifting said shiftable gear elements to obtain any one of a sequence of feed adjustments.

5. A drive mechanism for a table longitudinally translatable on a horizontal elongated bed comprising, in combination, a feed unit mounted in said bed and operatively connected to said table and including two adjustable multiple-feed gear mechanisms connected in series, each of said mechanisms having a shiftable gear element, two hydraulic actuators for shifting said elements selectively in opposite directions, means for supplying fluid under pressure, two reversing valves for connecting said supply means respectively to said actuators and each valve having a solenoid operator, and electrical control means for said solenoid operators including a control switch movable successively into different positions whereby to obtain a progression of predetermined feed changes.

6. A drive mechanism for a table longitudinally translatable on a horizontal elongated bed comprising, in combination, a feed unit mounted in said bed and operatively connected to said table and including two adjustable multiple-feed gear mechanisms connected in series, each of said mechanisms having a shiftable gear element movable alternately into two different positions, two hydraulic actuators mounted on said unit for shifting said elements selectively in opposite directions, means for supplying fluid under pressure, two two-position reversing valves for connecting said supply means respectively and reversibly to opposite ends of said actuators, and remote control means for selectively actuating said valves to adjust said gear elements into any one of a plurality of relative positions of adjustment.

7. A drive mechanism for a table longitudinally translatable on a horizontal elongated bed comprising, in combination, a feed unit mounted in said bed and operatively connected to said table and including two adjustable multiple-feed gear mechanisms connected in series, each of said mechanisms including a shiftable gear element operable in different positions of adjustment to establish different feed rate connections, two hydraulic piston and cylinder actuators having pistons operatively connected respectively to said gear elements, two solenoid valves for respectively controlling the operation of said hydraulic actuators, and electric circuits including a two-pole four-position switch for controlling said solenoid valves whereby to adjust said gear elements selectively into any one of their relative positions of adjustment.

8. A drive mechanism for a table longitudinally translatable on a horizontal elongated bed comprising, in combination, a feed unit mounted in said bed and operatively connected to said table and including two adjustable multiple-feed gear mechanisms connected in series, each of said mechanisms including a shiftable gear element operable in different positions of adjustment to establish different feed rate connections, two hydraulic piston and cylinder actuators having pistons operatively connected respectively to said gear elements and extending parallel to the direction of movement thereof, solenoid valve means for controlling said actuators, and electric circuits including switch means adjustable successively into different positions to effect operation of said actuators in a predetermined sequence, whereby to adjust said gear elements successively into different relative positions to effect a progression of feed changes.

KEITH F. GALLIMORE.